Dec. 18, 1923.
W. T. SEARS
SAFETY DEVICE FOR RADIAL DRILLS
Filed Feb. 26, 1923
1,477,599
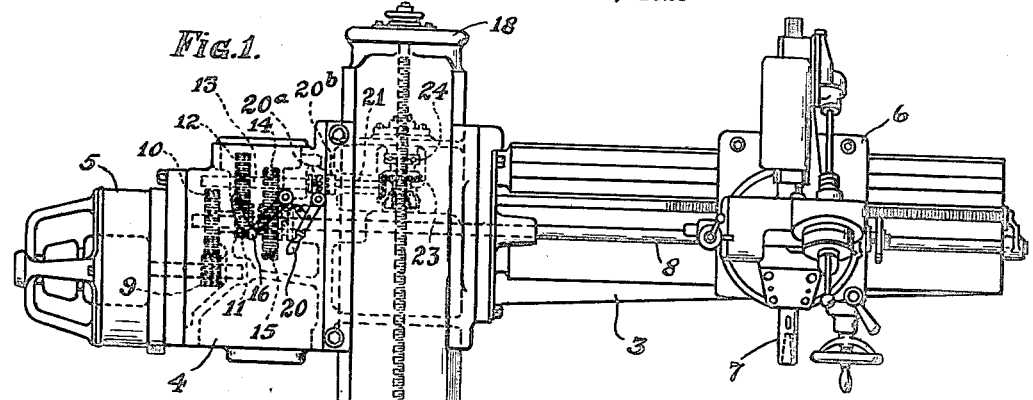
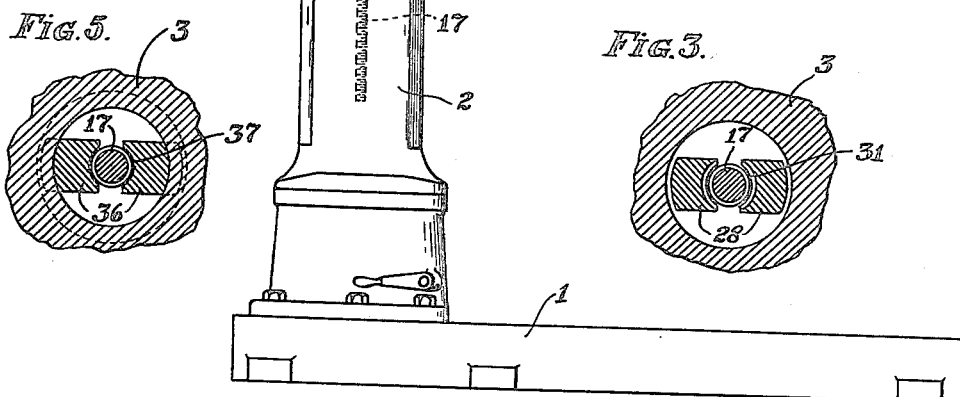
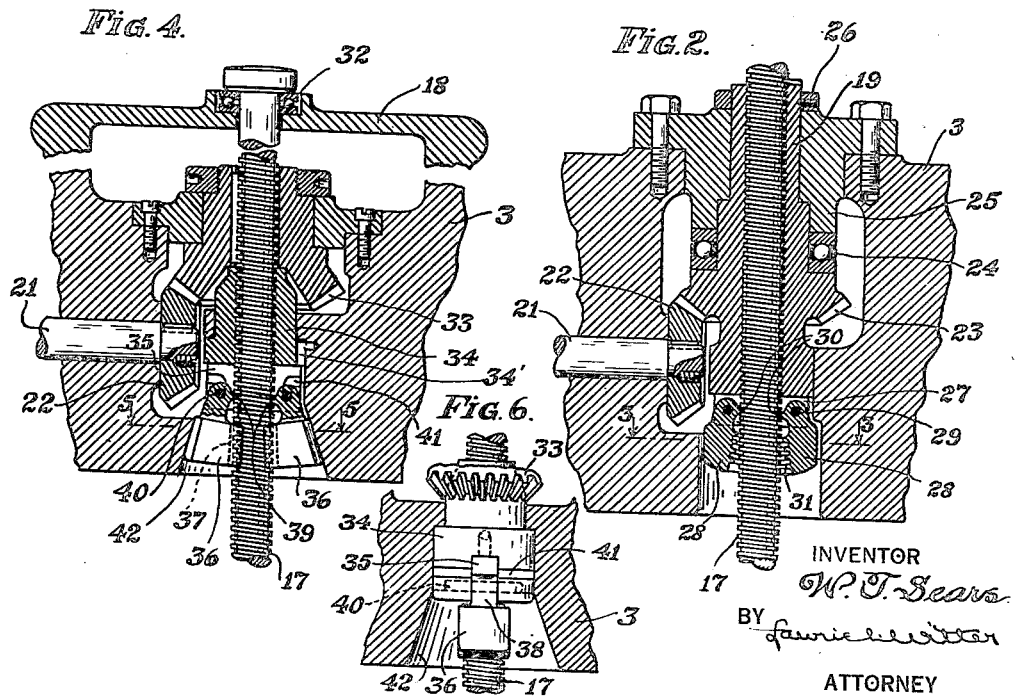
INVENTOR
W. T. Sears
BY
ATTORNEY Patented Dec. 18, 1923.

1,477,599

UNITED STATES PATENT OFFICE.

WILLARD T. SEARS, OF MONTCLAIR, NEW JERSEY, ASSIGNOR TO NILES-BEMENT-POND COMPANY, OF NEW YORK, N. Y., A CORPORATION OF NEW JERSEY.

SAFETY DEVICE FOR RADIAL DRILLS.

Application filed February 26, 1923. Serial No. 621,301.

*To all whom it may concern:*

Be it known that I, WILLARD T. SEARS, a citizen of the United States, residing at Montclair, in the county of Essex and State of New Jersey, have invented certain new and useful Improvements in Safety Devices for Radial Drills, of which the following is a specification.

This invention relates to safety devices and particularly to such a device as used in connection with a nut and screw for elevating a movable member supported thereby.

In the accompanying drawing, I have shown the device in connection with a radial drilling machine. Such machine comprises a column on which a drill spindle supporting arm is mounted for vertical movement by means of the nut and screw. The weight of the arm is considerable for which reason the threads of the nut frequently become worn to a dangerous degree, possibly permitting the dropping of the arm. An object of this invention is to provide improved means in the arm adapted to be automatically engaged with the screw to prevent dropping of the arm upon abnormal downward movement of the nut on the screw caused by the wearing of the nut and screw threads.

More specifically, it is an object of the invention to provide a pair of screw-threaded safety devices in connection with the nut which is mounted in the arm of the radial drill, such devices being preferably pivoted to the nut as illustrated and being adapted, upon abnormal downward movement of the nut on the screw, to be engaged with the screw threads to prevent dropping of the nut and arm thereon.

With the above and other objects in view, my invention consists in the features of construction and operation set forth in the following specification and illustrated in the accompanying drawing. In such drawing annexed hereto and forming a part of this specification, I have shown certain embodiments of my invention applied to a radial drill but it will be understood that the invention can be otherwise embodied and that the drawing is not to be construed as defining or limiting the scope of the invention, the claims appended to this specification being relied upon for that purpose.

Referring to the figures of the drawing:

Figure 1 is a front elevation of a radial drilling machine embodying my invention.

Fig. 2 is an enlarged vertical sectional view through a portion of the arm showing the screw with the nut and safety elements in connection therewith.

Fig. 3 is a cross sectional view taken on line 3—3 of Fig. 2.

Fig. 4 is a view like Fig. 2 but showing a modified form of the invention.

Fig. 5 is a cross sectional view taken on line 5—5 of Fig. 4.

Fig. 6 is a fragmentary side elevation of the nut and safety elements shown in Fig. 4.

Referring more specifically to the drawing by reference characters, 1 represents the base, 2 the column and 3 the vertically adjustable arm of a radial drilling machine. The column 2 is preferably divided and the arm 3 or a carrying member therefor extends between the two parts of the column and is suitably guided therein for vertical movement. Rigidly mounted at the rear end of the arm is a gear casing 4 which carries an electric motor 5. Slidably mounted on the other end of the arm is a saddle 6 carrying a head provided with a rotatable drill spindle 7. A driving shaft 8 extends longitudinally of the arm and serves to drive the spindle.

Mounted on the shaft of the motor 5 is a pinion 9 which meshes with a gear 10 loosely mounted on the shaft 8. Connected with the gear 10 is a pinion 11 which meshes with a gear 12 on a countershaft 13. Mounted on the shaft 13 is a pinion 14 which is adapted to mesh with a gear 15 splined on the shaft 8 and movable by means of a hand lever 16. With the parts in the position shown in Fig. 1, the shaft 8 is driven at a relatively low speed indirectly from the motor through the countershaft 13. When the gear 15 is moved toward the left it is disengaged from the pinion 14 and is engaged with clutch teeth at the end of the pinion 11, thus making a direct high speed drive from the gear 10 to the shaft 8. It will be understood that the entire gear mechanism, as described, is mounted within the casing 4 and that this casing, with the gearing and with the motor 5, is vertically movable with the arm 3. The invention contemplates the elevating and lowering of the arm by means operated from the countershaft 13.

The arm is supported on the column by a screw 17 hung from the top 18 of the column as illustrated. In the form of my invention shown in Figs. 1, 2 and 3, the screw is non-rotatably mounted on the column and a nut 19 rotatably mounted in the arm is threadedly engaged therewith. One element 20ᵃ of a toothed clutch is splined to the countershaft 13 and a lever 20 is adapted to engage the element 20ᵃ with the other clutch element 20ᵇ on a short shaft 21. A bevel gear 22 on shaft 21 meshes with a bevel gear 23 on the rotatable nut 19 in threaded engagement with the screw. Preferably, a ball bearing 24 is interposed between the bearing 25 on the arm and the nut. A collar 26 prevents downward movement of the nut with respect to the bearing. The mechanism so far described provides means for elevating or lowering the arm 3 on the column 2.

Since the entire weight of the arm is supported by the nut 19, the threads of the nut frequently become worn to a dangerous degree. The improved means whereby the arm is prevented from dropping when the nut threads become so worn will now be specifically described.

The lower end of the nut 19 is slotted at 27 and a pair of safety elements 28 are pivoted on pins 29 therein at opposite sides of the screw. Each element is provided with a screw thread engaging bill 30 and is screw threaded at 31. The parts are so relatively arranged that when in the normal position and the threads of the nut are unworn, the threaded portions 31 of the elements are held out of engagement with the screw by means of the bills 30. However, as the threads of the nut and screw wear, the nut settles downwardly on the screw and the bills 30 move the elements about their pivots in a manner to engage the screw threaded portions 31 with the screw threads. Such engagement of the elements with the screw threads prevents accidental dropping of the arm on the screw should the nut threads become worn away as above described.

In Figs. 4, 5 and 6, I have shown a modified form of my invention wherein the screw is the rotary element and the nut is the non-rotary element. In this construction, the screw 17 is rotatably supported on the column by ball bearings 32 and extends downwardly through the arm 3. A bevel gear 33 journaled in the arm and splined to the screw is adapted to be rotated from the shaft 21 and bevel gear 22. Beneath the bevel gear 33 is a nut 34 supporting the arm. A key 34' holds the nut from rotation. The lower end of this nut is slotted at 35 for receiving a pair of safety elements 36. These elements are similar to the elements 28 heretofore described except that the elements 36 are not screw threaded.

Each element 36 comprises a segmental shaped screw-engaging portion 37 and a reduced portion 38 for engaging in the nut slot 35. Each reduced portion 38 is provided with a screw thread engaging bill 39 and a pivot trunnion or pin 40. The opposite sides of the nut are furthermore slotted horizontally and vertically at 41 to receive the pins 40 therein. The element receiving opening in the arm is inclined at 42 to fit about the elements 36 for a purpose hereinafter described.

In Fig. 4, the parts are shown in the normal position, the screw engaging portions 37 of the elements being held disengaged from the screw by means of the bills 39. When the nut threads wear sufficiently to permit the arm to settle downwardly on the screw, the engagement of the arm at 42 with the elements forces the elements into frictional contact with the screw in a manner to support the arm from dropping. It should be noted that the engagement of the bills 39 with the screw threads prevent the elements 36 from moving downwardly with the nut and arm.

What I claim is:

1. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means connected to the nut and having a screw engaging portion normally disengaged from the screw, the said portion being adapted to be automatically engaged with the screw to prevent dropping of the movable member upon abnormal downward movement of the nut on the screw.

2. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means pivoted to the nut and adapted to be automatically moved about the pivot into engagement with the screw to prevent dropping of the movable member upon abnormal downward movement of the nut on the screw.

3. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and means mounted to travel with the nut on the screw and having a screw engaging portion normally disengaged from the screw, the said portion being adapted to be automatically engaged with the screw to prevent dropping of the movable member upon abnormal downward movement of the nut on the screw.

4. In a machine of the class described, the combination of a supporting member, a member movable vertically thereon, means comprising an interengaging nut and screw normally operative to elevate the movable member, the screw being mounted in one member and the nut in the other member, means for normally holding one of the elevating elements against rotation, means for rotating the other element, and a device connected to the nut and having a screw-threaded screw engaging portion normally disengaged from the screw, the said portion being adapted to be automatically engaged with the screw threads to prevent dropping of the movable member upon abnormal downward movement of the nut on the screw.

5. In a radial drilling machine, the combination of a supporting member, an arm movable vertically thereon, means comprising an interengaging nut and screw normally operative to elevate the arm, the screw being mounted in the supporting member and the nut in the arm, means for normally holding one of the elevating elements against rotation, means for rotating the other element, a device pivotally supported in the arm and having a screw engaging portion normally disengaged from the screw, the said portion being adapted to be automatically engaged with the screw to prevent dropping of the arm upon abnormal downward movement of the nut on the screw, and a projection of the device engaging the screw and operative to automatically control the position of the device.

6. In a radial drilling machine, the combination of a supporting member, an arm movable vertically thereon, means comprising an interengaging nut and screw normally operative to elevate the arm, the screw being mounted in the supporting member and the nut in the arm, means for normally holding one of the elevating elements against rotation, means for rotating the other element, a device pivoted to the nut and having a screw engaging portion, and means for normally holding the said screw engaging portion disengaged from the screw, the said means being adapted to automatically engage the said portion with the screw to prevent downward movement of the nut and arm upon abnormal downward movement of the nut on the screw.

7. In a radial drilling machine, the combination of a supporting member, an arm movable vertically thereon, means comprising an interengaging nut and screw normally operative to elevate the arm, the screw being mounted in the supporting member and the nut in the arm, means for normally holding one of the elevating elements against rotation, means for rotating the other element, a device pivoted to the nut and having a downwardly projecting screw-threaded screw engaging portion, and means engaging the screw and normally operative to hold the said screw engaging portion of the device disengaged from the screw, the said means being adapted to automatically engage the said portion with the screw threads to prevent downward movement of the nut and arm upon abnormal downward movement of the nut and screw.

8. In a radial drilling machine, the combination of a supporting member, an arm movable vertically thereon, means comprising an interengaging nut and screw normally operative to elevate the arm, the screw being mounted in the supporting member and the nut in the arm, means for normally holding one of the elevating elements against rotation, means for rotating the other element, a pair of segmental safety devices in the arm at opposite sides of the screw, and means for engaging the devices with the screw to support the arm upon abnormal downward movement of the nut and arm caused by wearing of the nut and screw threads.

9. In a radial drilling machine, the combination of a supporting member, an arm movable vertically thereon, means comprising an interengaging nut and screw normally operative to elevate the arm, the screw being mounted in the supporting member and the nut in the arm, means for normally holding one of the elevating elements against rotation, means for rotating the other element, a pair of screw-threaded segmental safety devices pivoted to the nut at opposite sides of the screw, and means cooperating with the screw threads for engaging the devices with the screw threads to support the arm upon abnormal downward movement of the nut and arm.

In testimony whereof I hereto affix my signature.

WILLARD T. SEARS.